Aug. 8, 1961 R. B. DARDEN 2,995,111
CATTLE SQUEEZE
Filed May 5, 1958 5 Sheets-Sheet 1

INVENTOR
Randall B. Darden
BY
Herman Levy — ATTORNEY

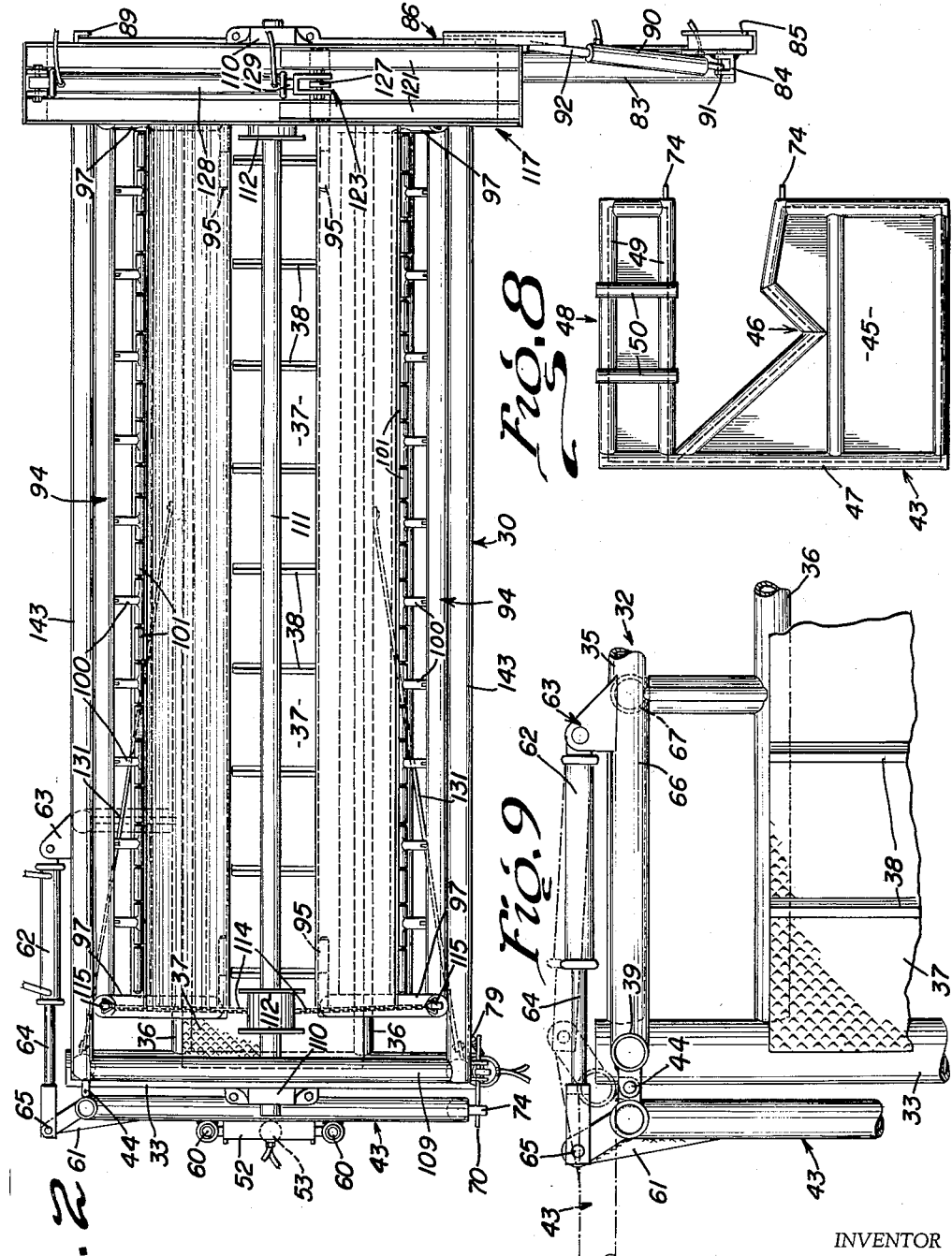

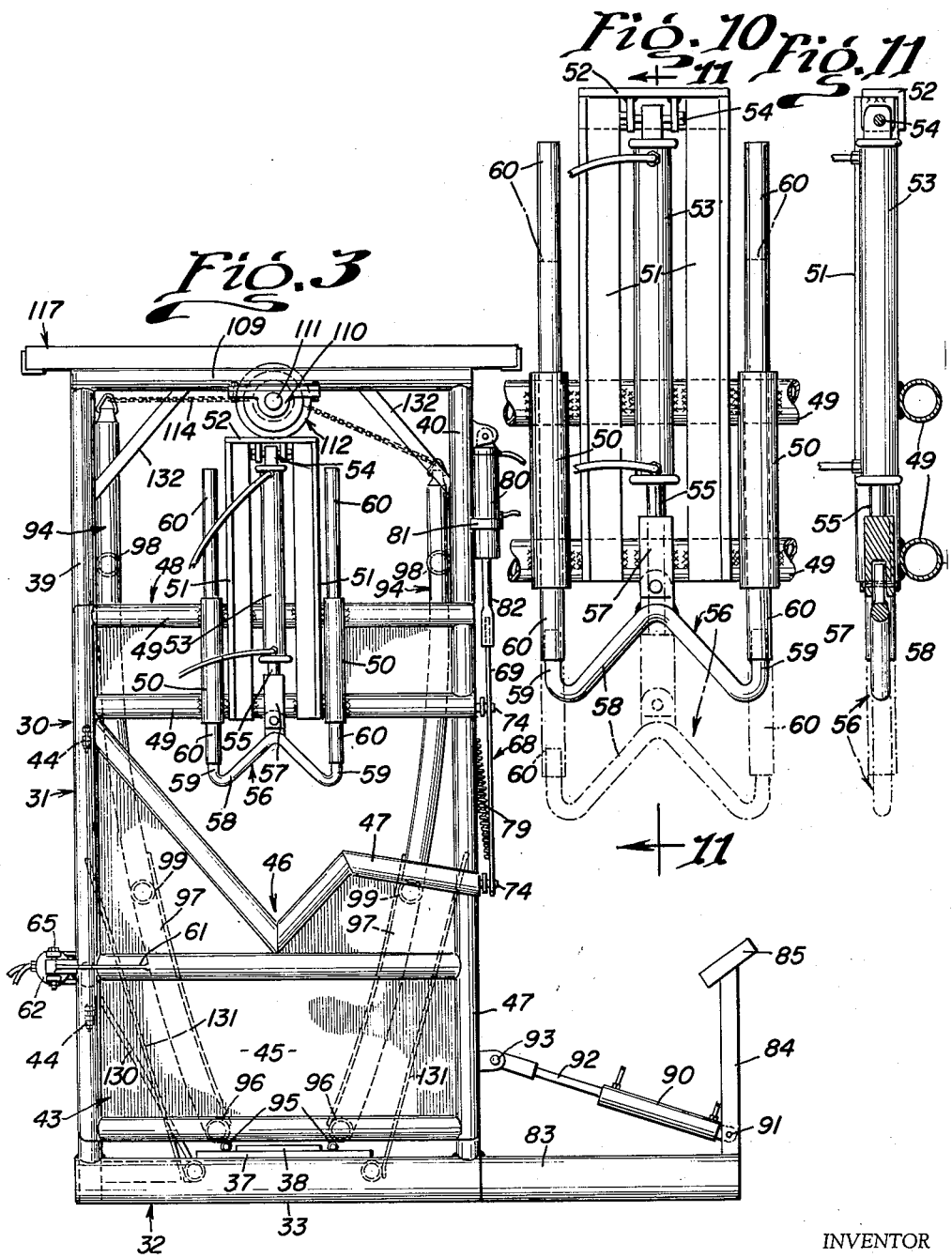

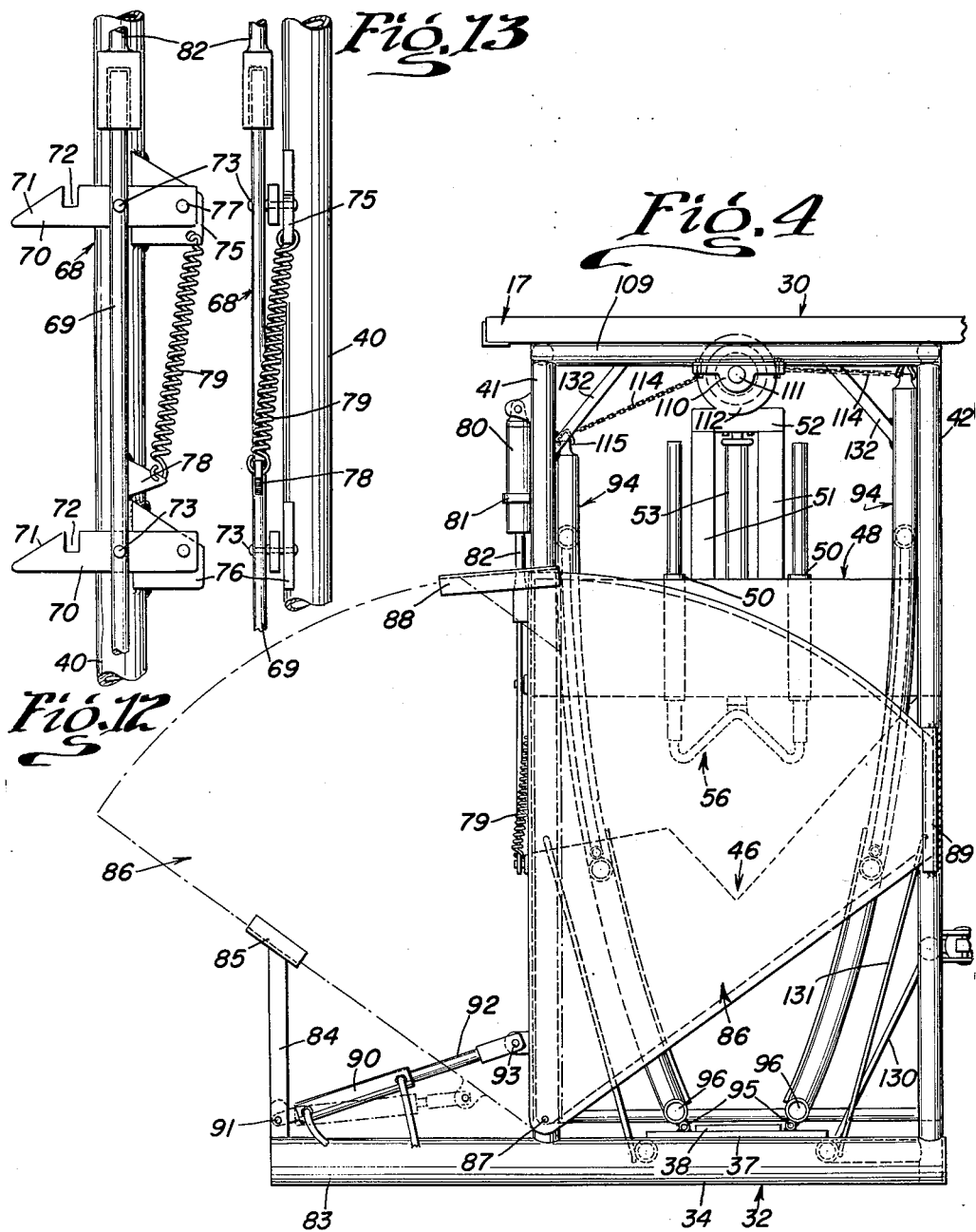

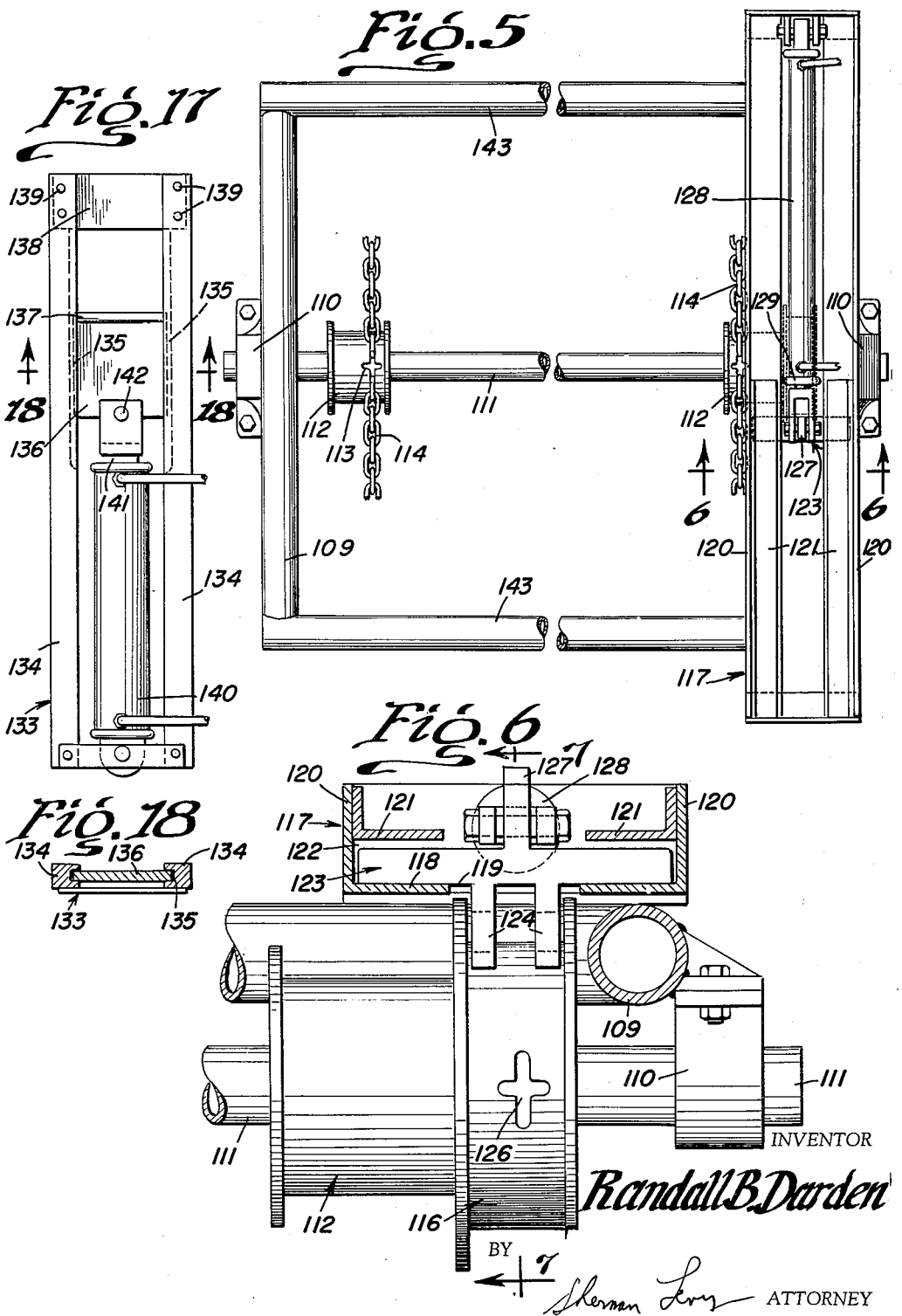

United States Patent Office 2,995,111
Patented Aug. 8, 1961

2,995,111
CATTLE SQUEEZE
Randall B. Darden, Fresno, Calif.
(515 N. M St., Tulare, Calif.)
Filed May 5, 1958, Ser. No. 733,001
3 Claims. (Cl. 119—99)

This invention relates to a cattle squeeze.

The object of the invention is to provide a device which is adapted to hold animals or cattle so as to facilitate branding, injecting or the like or otherwise working upon the cattle.

Another object of the invention is to provide a cattle squeeze which includes a hydraulic control mechanism wherein a rear gate can be readily opened and closed so as to permit an animal to enter the device, and wherein there is further provided a means for automatically or hydraulically opening and closing a front gate or door, and wherein there is further provided means for moving a pair of side members in and out so that cattle in the device can be conveniently held or squeezed so as to permit various types of treatments or operations to be carried out or performed on the animals or cattle.

A still further object of the invention is to provide a cattle squeeze which includes front and rear doors which can be readily opened and closed from a remote location, and wherein the cattle squeeze of the present invention further includes side members which can be moved towards and away from each other, and wherein there is further provided a hydraulically controlled neck engaging member and there is also provided a latch metchanism for the front gate, and wherein the latch mechanism is also adapted to be controlled by a suitable hydraulic arrangement.

A still further object of the invention is to provide a cattle squeeze or chute which is adapted to be used for immobilizing a cow, bull, or the like whereby such animal can be readily branded or given an injection or otherwise worked on, and wherein the cattle squeeze is constructed so that when the device is to be used, the back gate can be readily opened so that the cattle can be driven into the device and then the back gate can be conveniently closed and then the sides of the device are brought together through a suitable hydraulic system so that the cattle can be dehorned or otherwise worked on, and wherein there is further provided a means for engaging the neck of the animal so as to facilitate dehorning or injection of medicine, growth hormones or the like.

A further object of the invention is to provide a cattle squeeze which is extremely simple and inexpensive to manufacture.

Other objects and advantages will be apparent during the course of the following description.

In the accompanying drawings, forming a part of this application, and in which like numerals are used to designate like parts throughout the same:

FIGURE 2 is a top plan view of the cattle squeeze.

FIGURE 3 is a front elevational view of the cattle squeeze.

FIGURE 4 is a rear elevational view of the cattle squeeze.

FIGURE 5 is a fragmentary top plan view illustrating certain constructional details of the device.

FIGURE 6 is a sectional view taken on the line 6—6 of FIGURE 5.

FIGURE 8 is an elevational view illustrating the front door or front gate.

FIGURE 9 is a fragmentary plan view, illustrating the mechanism for opening and closing the front gate.

FIGURE 10 is a front elevational view illustrating the neck engaging member.

FIGURE 11 is a sectional view taken on the line 11—11 of FIGURE 10.

FIGURE 12 is a fragmentary elevational view illustrating the latch mechanism for holding the front gate closed or locked.

FIGURE 13 is a view taken at right angles to the view shown in FIGURE 12.

FIGURE 17 is an elevational view illustrating a dehorner.

FIGURE 18 is a sectional view taken on the line 18—18 of FIGURE 17.

Figure 1:
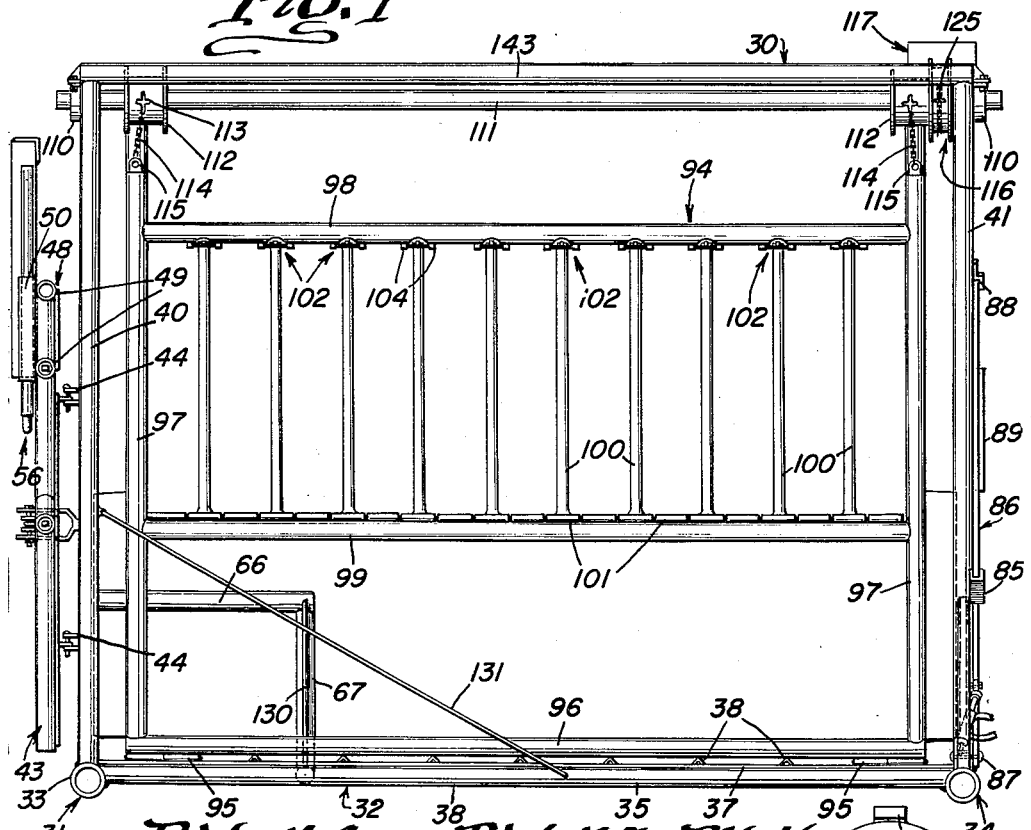
FIGURE 1 is a side elevational view illustrating the cattle squeeze of the present invention.

Referring in detail to the drawings, the numeral 30 designates the cattle squeeze of the present invention, and it will be seen that the cattle squeeze 30 includes a frame 31 that includes a horizontally disposed base 32. The base 32 consists of front and rear horizontally disposed end pieces 33 and 34, FIGURE 1, and the base 32 further includes a first pair of horizontally disposed spaced parallel beams 35 which extend between the end pieces 33 and 34 and which are secured thereto in any suitable manner, as for example by welding. Arranged between the first beams 35 is a second pair of horizontally disposed spaced parallel beams 36, and the ends of the beams 36 are secured to the end pieces 33 and 34 as by welding. The numeral 37 indicates a horizontally disposed flooring or platform which is supported on the end pieces and beams 36, and the flooring 37 may be secured in place as by welding. The flooring 37 may be roughened as illustrated in FIGURE 9 for example, and a plurality of spaced parallel angle members 38 are secured to the upper surface of the flooring 37 or formed integral therewith, and these angle members 38 help insure that the cattle in the device will not accidentally slip or fall or the like.

Extending upwardly from the front end piece 33 and secured thereto as by welding, is a pair of vertically disposed spaced parallel front posts 39 and 40, FIGURE 3. A pair of spaced parallel vertically disposed rear posts 41 and 42 extend upwardly from the rear end piece 34 and the posts 41 and 42 are secured to the piece 34 as by welding.

As shown in FIGURE 3 for example, there is provided a front gate or front door which is indicated generally by the numeral 43, and the gate 43 is mounted for swinging movement about a vertical axis. The front gate 43 is hingedly connected to the front post 39 by means of hinges 44, and the front gate 43 includes a main body portion 45 which is provided with a V-shaped recess 46, FIGURE 8. The numeral 47 indicates tubing or piping which extends around the outer edge portion of the door so as to help reinforce the door or gate 43. The gate 43 further includes an upper section 48 which is provided with a pair of spaced parallel horizontally disposed arms 49. As shown in the drawings, a pair of vertically disposed spaced parallel sleeves 50 are secured as by welding to the arms 49 of the upper section 48. There is further provided a pair of spaced parallel vertically disposed angle irons 51 which are also secured as by welding to the arms 49, and a cross-piece 52 extends between the upper ends of the angle irons 51 and is secured thereto. The numeral 53 indicates a hydraulic cylinder which has its upper end connected to the crosspiece 52 as at 54, and the hydraulic cylinder 53 serves to actuate a movable piston rod 55. The piston rod 55 is connected to a neck engaging member or yoke 56 by means of a connector 57, FIGURE 3. The yoke 56 includes a V-shaped portion 58 as well as portions 59 which are secured to vertically disposed legs 60, and the legs 60 are mounted for sliding movement in the sleeves 50. Thus, by actuating the cylinder 53 the yoke 56 can be moved downwardly so that the V-shaped portion 58 will coact with the recess 46 to engage or hold an animal's head or neck therebetween as for example when an animal is to be worked on.

A means is provided for opening and closing the front gate 43, whereby the front gate 43 can be pivoted or swung about a vertical axis. This means comprises a gusset 61 which is secured as by welding to the front gate 43, FIGURE 9, and a hydraulic cylinder 62 is supported as at 63, and the cylinder 62 has a piston rod 64 extending therefrom, the piston rod 64 being pivotally connected to the gusset 61 by means of a pivot pin 65. The cylinder 62 is supported adjacent a member 66 which is maintained in its proper position by means of a brace member 67. Thus, by actuating the cylinder 62, the piston rod 64 can be moved so as to swing the front gate 43 to open or closed position.

A latch mechanism 68 is provided for selectively retaining the front gate 43 locked or closed, and the latch mechanism 68 is shown in detail in FIGURES 12 and 13. Thus, the latch mechanism 68 includes a vertically shiftable bar or rod 69 which has a pair of keepers 70 pivotally connected thereto by means of pins 73. It will be seen that there is provided an upper and lower keeper 70, and each of these keepers includes an inclined surface 71 as well as a slot or cutout 72. A pair of horizontally disposed spaced spart fingers 74 extend outwardly from one side of the gate 43, and the fingers 74 are adapted to selectively engage the slot 72 in the keeper 70. Extending outwardly from the front post 40 is a pair of spaced apart lugs 75 and 76, and the keepers 70 are pivotally connected to these lugs by means of pivot pins 77. An ear 78 of triangular formation is secured as by welding to the shiftable bar 69, and a coil spring 79 has its lower end connected to the ear 78, while the upper end of the spring 79 is connected to the upper lug 75. The spring 79 functions as a return spring so as to normally urge or bias the bar 69 and its associated parts to raised position. The numeral 80 indicates a hydraulic cylinder which is stationary and which is connected as at 81 to the post 40, and the cylinder 80 serves to actuate a movable piston rod 82, the piston rod 82 being connected to the upper end of the bar 69. Thus, by properly actuating the cylinder 80, the bar 69 can be moved downwardly to thereby cause the pair of keepers 70 to pivot in a counterclockwise direction about an axis extending through the pins 77 so that the slots 72 can move clear of the fingers 74 whereby the front gate 43 can then be moved open or swung open by means of the hydraulic cylinder 62. As long as the keepers 70 are in raised position, the slots 72 receive the fingers 74 so as to prevent accidental opening of the front gate. The spring 79 functions as a return spring to normally urge or maintain the keepers 70 in raised position.

The rear end piece 34 is provided with an extension 83, and extending upwardly from the extension 83 and secured thereto is an upright 84 which has an inclined support member 85 of channel formation secured thereto. The numeral 86 indicates a rear door or rear gate which is mounted for movement into and out of closing or opening relation with respect to the rear end of the device, and the gate 86 has its lower end portion pivotally connected to the lower end of the post 41 by means of a pivot pin 87. Support members 88 and 89 are spaced from each other and are secured to the rear of the frame for selectively receiving the gate 86 so that for example when the gate 86 is in closed position, the support members 88 and 89 will help maintain the gate 86 in its proper aligned position and wherein the gate will not be accidentally bent or kicked out of place by an animal being held in the squeeze.

A means is provided for opening and closing the rear gate 86, and this means comprises a hydraulic cylinder 90 which has one end connected to the upright 84 as at 91. The cylinder 90 is provided with a movable piston rod 92 which is connected to the rear gate 86 as at 93. Thus, with the gate 86 in closed position, it will be seen that the cylinder 90 can be actuated to thereby retract the piston rod 92 so as to pull the gate 86 from the position shown in solid lines in FIGURE 4 to the position shown in broken lines so that an animal can be readily moved into the device, and then the cylinder 90 can be actuated to close the gate 86 so as to prevent the animal from accidentally leaving the device.

Figure 14:
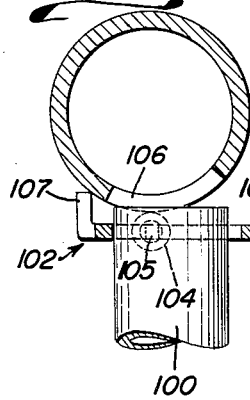
FIGURE 14 is a fragmentary sectional view illustrating the locking mechanism for use with the frame pieces of the side members.
Figures 15, 16:
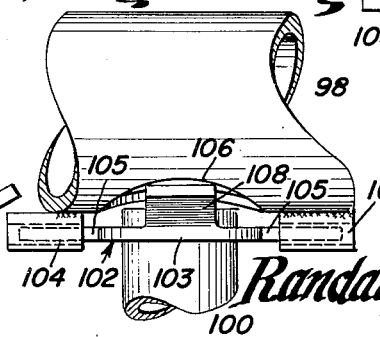
FIGURE 15 is a view taken at right angles to the view shown in FIGURE 14.
FIGURE 16 is a plan view of one of the locking collars for the assembly of FIGURES 14 and 15.

There is further provided a pair of movable side members or side wall units which are each generally indicated by the numeral 94, and as shown in FIGURE 4 for example, the side members 94 have a somewhat curved or arcuate formation so as to snugly conform to the configuration of the animal being held. Each of the side members 94 is pivotally or hingedly connected to the flooring 37 of the base 32 by means of hinges 95, FIGURE 1. Each side member 94 includes a horizontally disposed bottom piece 96 and spaced apart standards 97 which have a slight curvature as for example as shown in FIGURE 4. The side members 94 further include horizontally disposed spaced parallel upper and lower cross members 98 and 99 which extend between the standards 97 and which are secured thereto as by welding. There is further provided a plurality of spaced parallel frame pieces 100 which have their lower ends hingedly connected to the cross member 99 by means of hinges 101, and locking devices 102 are provided for selectively locking the frame pieces 100 to the cross member 98. However, when desired, the locking devices 102 can be unlocked so that any of the frame pieces 100 can be swung down and this arrangement provides sufficient clearance to permit a person to insert his arm or hand through such space or clearance as for example when an animal in the device is to be injected with hormones or the like. In FIGURES 14, 15 and 16 there is illustrated in detail the construction of one of the locking devices 102, and it will be seen that each locking device comprises an elliptical shaped collar 103 which is mounted on the upper end of each of the frame pieces 100. Bushings 104 are secured as by welding to the lower surface of the cross member 98, and a pair of diametrically opposed pin portions 105 extend outwardly from each of the collars 103, and the pin portions 105 are rockably or pivotally connected to the bushings 104. The member 98 is provided with cutouts or recesses 106 which provide clearance for the upper ends of the frame pieces 100, and each collar 103 is provided with an upstanding portion 107 as well as an offset finger engaging portion 108, and the portions 107 help retain the frame pieces 100 in their upright position. However, by manually manipulating the portions 108, the portion 107 can be moved sufficiently so as to permit the frame pieces 100 to pivot on the hinges 101 so that as previously described, a person can readily provide more clearance for gaining access to an animal within the chute or squeeze.

Extending between the upper ends of the front and rear posts and secured thereto as by welding, are horizontally disposed top pieces 109. A bearing 110 is secured to each top piece 109, and a horizontally disposed shaft 111 has its ends journaled in the bearings 110. A pair of pulleys 112 are fastened to the shaft 111, and each of the pulleys 112 is provided with a slot or cutout 113. Chains 114 are connected to the slotted portions 113 of the pulleys 112, and a pair of chains 114 have their ends connected to the front and rear upper portions of the side members 94 as at 115.

Figure 7:
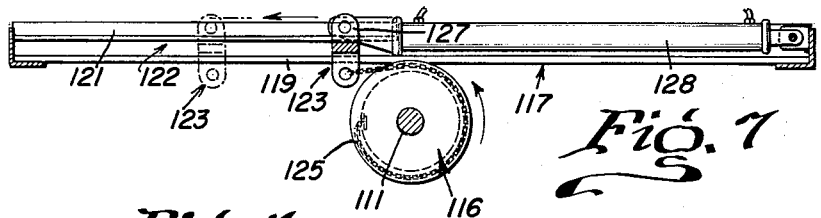
FIGURE 7 is a sectional view taken on the line 7—7 of FIGURE 6.

The numeral 116 indicates a winch or windlass which is also fastened to the shaft 111, and the numeral 117 indicates a supporting unit which is mounted above the rear portion of the frame. The supporting unit 117 is shown in detail in FIGURE 6 and comprises a horizontally disposed bottom section 118 which has an elongated opening 119 therein. The supporting unit 117 further includes a pair of spaced parallel vertically disposed side sections 120. A pair of L-shaped bars 121 are secured to the inner surfaces of the sections 120 in any suitable manner, as for example by welding, and these bars 121 help define a trackway 122 therebelow. The numeral 123 indicates a sliding bracket which is slidably or adjustably mounted in the trackway 122, FIGURE 6, and the bracket 123 is provided with a pair of depending apertured ears 124. A chain 125 is connected to the apertured ears 124, FIGURE 7, and the chain 125 is also connected to a slotted portion 126 of the winch 116. The ears 124 are mounted for sliding movement through the opening 119 in the bottom section 118. A lug 127 extends upwardly from the bracket 123 and is secured thereto or formed integral therewith, and a hydraulic cylinder 128 has its movable piston rod 129 connected to the lug 127. Thus, as the cylinder 128 is actuated by hydraulic fluid from a suitable source of supply, the piston rod 129 can be moved and this will cause sliding movement of the bracket 123 in the trackway 122. Thus, with the side members 94 in open position, it will be seen that this actuation of the cylinder 128 can be used for moving the chain 125 to thereby properly rotate the windlasss 116 which in turn will rotate the shaft 111. As the shaft 111 turns, it rotates the pair of pulleys 112 which will wind the chains 114 in such a manner as to move the pair of side members 94 to closed position so that the animal in the device can be squeezed. By means of a reverse movement of the hydraulic cylinder, the side members 94 can be permitted to move open or swing open on an axis extending through the hinges 95.

Suitable braces can be provided wherever desired or required to help reinforce the device, as for example braces 130, 131 and 132 can be provided.

As shown in FIGRES 17 and 18 a dehorner 133 may be provided for use with the cattle squeeze of the present invention, and the dehorner 133 includes a movable cutting member or blade 136 that is mounted for sliding movement in grooves 135 of side bars 134. The blade 136 is preferably provided with a sharp cutting edge 137, and the blade 136 is adapted to coact with a stationary member 138 that is secured between the side bars 134 in any suitable manner, as for example by means of securing elements 139. A hydraulic cylinder 140 is provided for actuating the blade 136, and the cylinder 140 serves to move a piston rod 141 which is connected to the movable blade 136 as at 142, FIGURE 17.

As shown in the drawings there is further provided a pair of horizontally disposed spaced parallel crossbars 143 which serve to connect the front and rear upper portions of the frame together, and the various parts of the frame may be made of a suitable material such as angle iron, pipes or the like.

The cattle squeeze is especially suitable for immobilizing a cow, bull or the like so that such an animal can be readily branded or given an injection or otherwise worked on. In FIGURES 17 and 18 there is illustrated a portable dehorning device which can be used for dehorning the cattle, and to dehorn the cattle, the device 133 is arranged so that the movable blade 136 can sever the horn upon actuation of the cylinder 140. Thus, when the cylinder 140 is actuated, the piston rod 141 can be moved outwardly to thereby move the blade 136 toward the member 138 so that with a horn in the space between the blade 136 and member 138, it can be seen that such a horn can be readily severed. The blade 136 is slidably arranged in the grooves 135 of the side bars 134.

In use, the back gate 86 of the squeeze of chute is opened by properly actuating the hydraulic cylinder 90 and then cattle are driven into the device through a narrow alleyway. Then, the back gate 86 is closed and the sides 94 of the chute are brought together by actuating the hydraulic cylinder 128 so that the cattle are now ready for branding.

For dehorning or implanting or injecting medicine, the head of the cattle is placed through the opening 46 in the front gate 43 and then the neck member 56 is lowered hydraulically to thereby secure the body and head of the cattle for dehorning and injecting either medicine, growth hormones or the like.

The parts can be made of any suitable material and in different shapes or sizes. The dehorner of FIGURES 17 and 18 is portable and suitable handles and controls can be used wherever required or desired. The member 138 of the dehorner constitutes a stop member.

It is to be understood that suitable hydraulic valves as well as a pump and reservoir are adapted to be used with the squeeze of the present invention so that the hydraulic fluid which flows to the various cylinders can be readily controlled as desired. A suitable hydraulic control system can be arranged so that the same control is used for both locking and operating the cylinders on the front gate. The various parts of the frame can be made of a suitable material such as heavy duty pipe. Where possible, the hydraulic lines are run through such pipes for convenience. The locking devices 102 are provided for holding the frame pieces 100 in an upright position, and these devices 102 can be unlocked when the frame pieces 100 are to be swung downwardly on an axis extending through the hinges 101. The member 85 constitutes a stop member for limiting outward pivotal movement of the rear gate 86. In FIGURE 4 the dotted lines indicate the position of the gate 86 when the gate is open, while the solid lines in FIGURE 4 show the position of the gate when the gate is closed. When the gate 86 is closed, it moves into engagement with the member 89. The cylinders are adapted to have a suitable stroke which will accomplish the necessary movement of the parts being actuated. The sleeves 50 which are secured to the upper section 48 of the front gate 43 constitute guides for the movable members 60 which form part of the neck engaging member 56. The bracket 123 constitutes a slide which is moved when the cylinder 128 is actuated so as to permit a means for moving the side members 94 together so that the animal in the device can be readily squeezed.

The cylinder 90 is actuated to retract the piston rod 92 so that the rear gate 86 can be swung from the solid line position shown in FIGURE 4 to the open or broken line position shown in FIGURE 4 whereby a cattle or animal to be worked on can move into the squeeze or chute through the rear open end of the device. Then, the cylinder 90 can be actuated to move the piston rod 92 outwardly whereby the rear gate 86 will swing on its pivot 87 to the closed position indicated in solid lines in FIGURE 4 whereby the animal will be restrained. When the gate 86 is in open position, the gate rests in the support member 85, and when the gate 86 is in closed position, it engages the member 89 which helps insure that the gate will be properly aligned in its various positions. Next, the cylinder 128 is actuated to thereby move the piston rod 129 and since the rod 129 is connected to the slide or bracket 123, it will be seen that this actuation of the cylinder 128 will cause movement of the bracket 123 in the trackway 122. As the bracket 123 moves it moves the chain 125 which is connected thereto, and since the chain 125 is connected to the winch 116, it will be seen that this actuation of the cylinder 128 causes rotation of the winch 116 which is affixed to the shaft 111 and this in turn causes rotation of the shaft 111. As the shaft 111 rotates, the pair of pulleys 112 thereon will rotate, and with the chains 114 connected to the pulleys 112, it will be seen that the chains 114 will be moved. The chains 114 are connected to the corners of the side members 94 as at 115, so that this rotation of the pulleys 112 will move the pair of side members 94 inwardly to thereby squeeze the animal therebetween. The curvature of the side members 94 as shown in FIGURE 3 for example, helps insure that these side members will snugly conform to the curvature of the animal being held. By actuating the cylinder 128 in a reverse manner, the parts will move in the opposite directions so that the side members 94 can move outwardly by gravity whereby the side members 94 can pivot on the hinges 95.

The head or neck of the animal is adapted to be arranged in engagement with the recess 46 in the front gate 43, and then by actuating the cylinder 53, the member 56 can move downwardly so that the animal's neck will be securely and comfortably gripped between the portions 58 and 46 whereby the animal can be dehorned or otherwise worked on. Thus, when the cylinder 53 is properly actuated, the rod 55 will move downwardly to thereby move the yoke 56 downwardly from the solid line position shown in FIGURE 10 or 11 to the broken line position shown in these figures whereby the animal will be properly gripped. As the yoke 56 moves downwardly, the rods 60 slide in the sleeves 50, and the sleeves 50 are secured as by welding to the upper section 48 of the front gate 43. By actuating the cylinder 53 in the reverse manner, the yoke 56 can be raised.

It is to be noted that there is further provided the latch mechanism which is indicated generally by the numeral 68, and the latch mechanism 68 serves to maintain the front gate 43 in closed or locked position. However, when it is desired to open the front gate as for example to permit the animal to move out of the squeeze, then it is only necessary to apply or supply hydraulic fluid to the cylinder 80 which will move the bar 69 downwardly and as the bar 69 moves downwardly, it causes the pair of keepers 70 to pivot in a counterclockwise direction about an axis extending through the pins 77. This pivotal movement of the keepers 70 permits the slots 72 to free the fingers 74 on the gate 43 so that the front gate 43 is free to pivot or swing about a vertical axis. Normally, when pressure is released on the latch mechanism, the spring 79 will return the parts to the position shown in FIGURES 12 and 13 for example, so that the fingers 74 will be prevented from accidentally coming out of the slots 72 so that accidental opening of the front gate will be prevented. The inclined surfaces 71 act as guides so that as the front gate moves from open to closed position, the fingers 74 can travel along the inclined surfaces 71 to partially depress or pivot the keepers 70 until the fingers 74 seat in the slots 72.

After the latch mechanism 68 has been actuated to unlock the front gate 43, the cylinder 62 can be actuated to thereby move the piston rod 64, and since the piston rod 64 is connected to the gusset 61 as at 65, it will be seen that this actuation of the cylinder 62 can swing open the front gate 43 from the solid line position shown in FIGURE 9 to the dotted line position shown in FIGURE 9 so that an animal can pass out through the front of the device.

The locking devices 102 are constructed so that any of the frame pieces 100 can be swung downwardly and to unlock any of the devices 102, it is only necessary to manually pivot the collar 103 so that the various parts of the locking collar can clear the member 98 whereby the frame pieces 100 are free to swing on their hinges 101.

Minor changes in shape, size and rearrangement of details coming within the field of invention claimed may be resorted to in actual practice, if desired.

I claim:
1. In a cattle squeeze, a frame including a horizontally disposed base, a pair of side members having their lower end portions hingedly connected to said base, said frame further including vertically disposed front and rear posts extending upwardly from said base, horizontally disposed top pieces secured to the upper ends of said front and rear posts, bearings conected to said top pieces, a horizontally disposed shaft having its ends journalled in said bearings, first and second pulleys mounted on said shaft, chains connected to said pulleys and to the upper portions of said side members, a winch on said shaft, a support unit mounted adjacent the upper rear portion of the frame, said support unit comprising a horizontally disposed bottom section having an elongated opening therein, and said support unit further including spaced parallel vertically disposed side sections, a pair of L-shaped bars secured to the inner surfaces of said side sections and defining therebelow a trackway, a bracket slidably mounted in said trackway and including a pair of spaced parallel depending apertured ears projecting through the opening in the bottom section of the support unit, a chain connecting said last named ears to said winch, a lug extending upwardly from said bracket, and a hydraulic cylinder having a movable piston rod connected to said last named lug.

2. In a cattle squeeze, a frame including a base, a pair of side members hingedly connected to said base, said frame further including front and rear posts extending upwardly from said base, top pieces secured to said front and rear posts, bearings connected to said top pieces, a shaft having its ends journalled in said bearings, first and second pulleys mounted on said shaft, chains connected to said pulleys and to said side members, a winch on said shaft, a support unit mounted adjacent the upper rear portion of the frame, said support unit comprising a bottom section having an elongated opening therein, and said support unit further including side sections, a pair of bars secured to said side sections and defining therebelow a trackway, a bracket slidably mounted in said trackway and including a pair of apertured ears projecting through the opening in the bottom section of the support unit, a chain connecting said last named ears to said winch, a lug extending upwardly from said bracket, and a hydraulic cylinder having a movable piston rod connected to said last named lug.

3. In a cattle squeeze, a frame including a horizontally disposed base, a pair of side members having their lower end portions hingedly conected to said base, said frame further including vertically disposed front and rear posts extending upwardly from said base, top pieces secured to said front and rear posts, bearings connected to said top pieces, a horizontally disposed shaft journalled in said bearings, pulleys mounted on said shaft, chains connected to said pulleys and to the upper portions of said side members, a winch on said shaft, a movable piston rod mounted on said frame, and means operatively connecting said piston rod to said winch so that when the piston rod is moved, the winch will be rotated to move the chains and thereby adjust the side members of said frame.

References Cited in the file of this patent

UNITED STATES PATENTS

| 733,874 | Reck | July 14, 1903 |
| 2,557,477 | Simon | June 19, 1951 |
| 2,576,654 | Thorson | Nov. 27, 1951 |
| 2,593,559 | Heldenbrand | Apr. 22, 1952 |
| 2,650,567 | Whitworth | Sept. 1, 1953 |